(12) United States Patent
Yamaguchi et al.

(10) Patent No.: US 12,032,231 B2
(45) Date of Patent: Jul. 9, 2024

(54) OPTICAL SIGNAL PROCESSING APPARATUS AND MANUFACTURING METHOD THEREOF

(71) Applicant: Nippon Telegraph and Telephone Corporation, Tokyo (JP)

(72) Inventors: Keita Yamaguchi, Musashino (JP); Ai Yanagihara, Musashino (JP); Kenya Suzuki, Musashino (JP); Takashi Go, Musashino (JP); Osamu Moriwaki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 427 days.

(21) Appl. No.: 17/311,959

(22) PCT Filed: Dec. 24, 2019

(86) PCT No.: PCT/JP2019/050556
§ 371 (c)(1),
(2) Date: Jun. 8, 2021

(87) PCT Pub. No.: WO2020/138053
PCT Pub. Date: Jul. 2, 2020

(65) Prior Publication Data
US 2022/0066244 A1    Mar. 3, 2022

(30) Foreign Application Priority Data
Dec. 26, 2018 (JP) ................................ 2018-243258

(51) Int. Cl.
*G02F 1/01* (2006.01)
*B29D 11/00* (2006.01)
(Continued)

(52) U.S. Cl.
CPC ...... *G02F 1/0147* (2013.01); *B29D 11/00932* (2013.01); *G02F 1/212* (2021.01); *G02F 1/2257* (2013.01)

(58) Field of Classification Search
CPC ......... G02B 2006/12038; G02F 1/0147; G02F 1/0113; G02F 1/212; G02F 1/2257
See application file for complete search history.

(56) References Cited

U.S. PATENT DOCUMENTS 8,150,218 B2 * 4/2012 Takahashi ............... G02F 1/011
 385/132
2002/0064360 A1 * 5/2002 Makikawa ............. G02B 6/132
 385/132
2018/0106964 A1 * 4/2018 Luo ..................... G02B 6/12002

FOREIGN PATENT DOCUMENTS

JP   H10-104451 A   4/1998
JP   2001-51144 A   2/2001
(Continued)

OTHER PUBLICATIONS

T. Shibata et al., *Silica-Based Waveguide-Type 16 × 16 Optical Switch Module Incorporating Driving Circuits*, IEEE Photonics Technology Letters, vol. 15, No. 9, 2003, pp. 1300-1302.
(Continued)

*Primary Examiner* — Omar R Rojas
(74) *Attorney, Agent, or Firm* — Workman Nydegger (57) ABSTRACT

The present invention realizes an optical signal processing device that enables using a thermal oxidation silica film as the under clad of a silica PLC while also increasing the thickness of the under clad and reducing the time required for film growth during manufacturing. The optical signal processing device is formed as a planar optical circuit that includes an optical waveguide formed on a silicon substrate, and has a phase modulation element that employs a thermo-optical effect. A plurality of silica films are provided
(Continued)

between a core of the optical waveguide and the silicon substrate, and at least one of the silica films was formed by thermal oxidation.

8 Claims, 8 Drawing Sheets

(51) Int. Cl.
*G02F 1/21* (2006.01)
*G02F 1/225* (2006.01)

(56) References Cited

FOREIGN PATENT DOCUMENTS

| JP | 2002-162526 A | 6/2002 |
|---|---|---|
| JP | 2004-45453 A | 2/2004 |
| JP | 2004-85868 A | 3/2004 |

OTHER PUBLICATIONS

Kikuo Yamabe et al., *Atomic Level Thickness Uniformity and Reliability of Ultrathin Silicon Dioxide Films Thermally Grown on Crystalline Silicon*, Journal of the Vacuum Society of Japan, vol. 58, No. 1, 2015, pp. 27-34.

Kazuyoshi Furukawa, *Silicon Wafer Direct-Bonding Technique*, Journal of the Welding Society, vol. 59, No. 2, 1990, pp. 105-109.

Takashi Goh et al., *High-Extinction Ratio and Low-Loss Silica-Based 8×8 Strictly Nonblocking Thermooptic Matrix Switch*, Journal of Lightwave Technology, vol. 17, No. 7, 1999, pp. 1192-1199.

Toshio Watanabe et al., *Silica-based PLC Transponder Aggregators for Colorless, Directionless, and Contentionless ROADM*, OFC/NFOEC Technical Digest, Mar. 4, 2012, pp. 1-3.

Kei Watanabe et al., *Ultralow Power Consumption Silica-Based PLC-VOA/Switches*, Journal of Lightwave Technology, vol. 26, No. 14, 2008, pp. 2235-2244.

\* cited by examiner

OPTICAL SIGNAL PROCESSING APPARATUS AND MANUFACTURING METHOD THEREOF

TECHNICAL FIELD

The present invention relates to an optical signal processing device and a method for manufacturing the optical signal processing device.

BACKGROUND ART

Conventionally, an optical signal processing devices constituted by a planar lightwave circuit (PLC) formed using a silica (silicon dioxide, $SiO_2$) material have played an important role in optical communication. In a silica PLC, light can be confined in a very small optical waveguide of several to several tens of μm, and an optical signal processing device that exhibits various functions can be configured with a small chip. The functionality of an optical switch that uses a silica PLC can also be integrated on a chip, and control thereof is realized through a thermo-optical effect obtained using an electrical signal.

Figure 1:
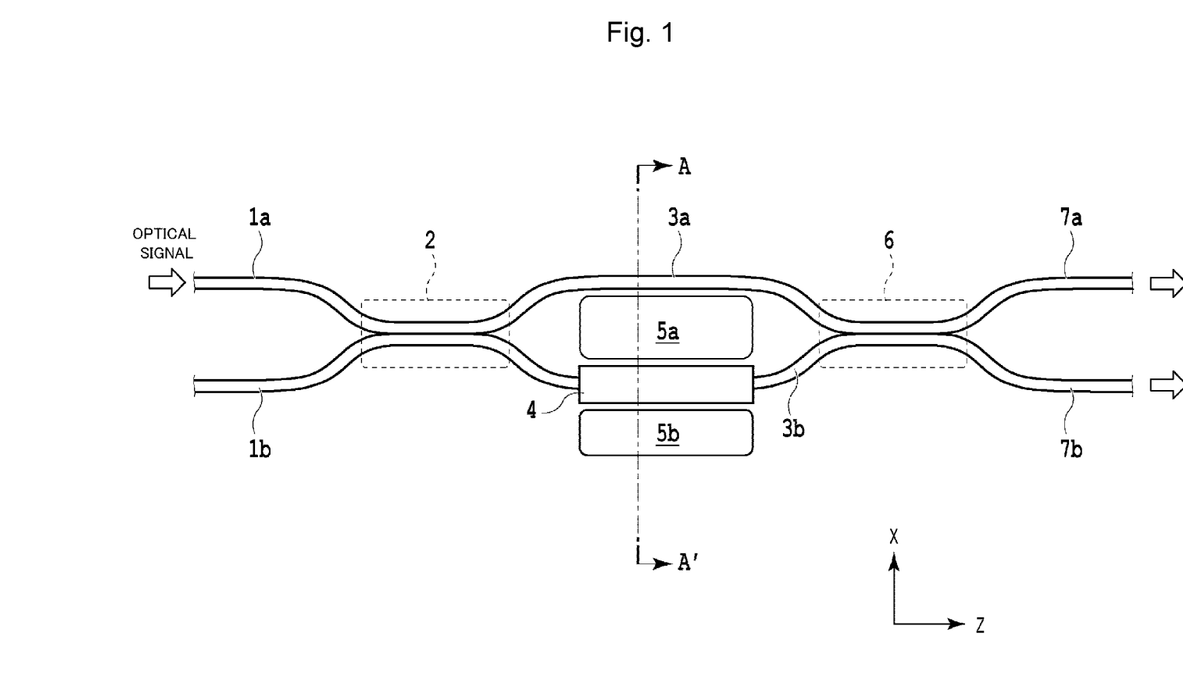
FIG. 1 is a diagram schematically showing the optical circuit (MZI) of a PLC optical switch as one example of a conventional optical signal processing device.

FIG. 1 schematically shows the optical circuit of a PLC optical switch as one example of a conventional optical signal processing device. In this optical circuit, which constitutes a Mach-Zehnder interferometer (MZI), an optical signal is input from either one of two input waveguides 1a and 1b (e.g., 1a) on the left side to a two-input two-output directional coupler 2 on the left side and demultiplexed to arm optical waveguides 3a and 3b, and is then multiplexed in a two-input two-output directional coupler 6 on the right side and output from output waveguides 7a and 7b in accordance with the interference result.

A phase shifter heater 4, which is a phase modulation element, is provided over the arm optical waveguide 3b, which is one of the two branched arm optical waveguides, and heat insulating grooves 5a and 5b are provided on opposite sides of the arm optical waveguide 3b. When power is supplied to the phase shifter heater 4 so as to supply heat to the arm optical waveguide 3b, the guided light in the arm waveguide 3b undergoes a phase change due to a thermo-optical effect, thus achieving the function of a phase modulation element (phase shifter) (e.g., see PTL 1).

The power needed to drive the silica PLC switch is the drive power of the phase modulation element (phase shifter) heater 4. In the optical switch shown in FIG. 1, the phase of the guided light is modulated by changing the refraction index of the lower arm optical waveguide 3b through heat from the phase shifter heater 4. In the MZI circuit in FIG. 1, depending on the phase difference between the light beams passing through the upper and lower arm waveguides, the interference condition in the directional coupler 6 changes, and the output light intensity of the two output waveguides 7a and 7b changes, and therefore the optical switching function can be realized by controlling the phase modulation element.

Figure 2:
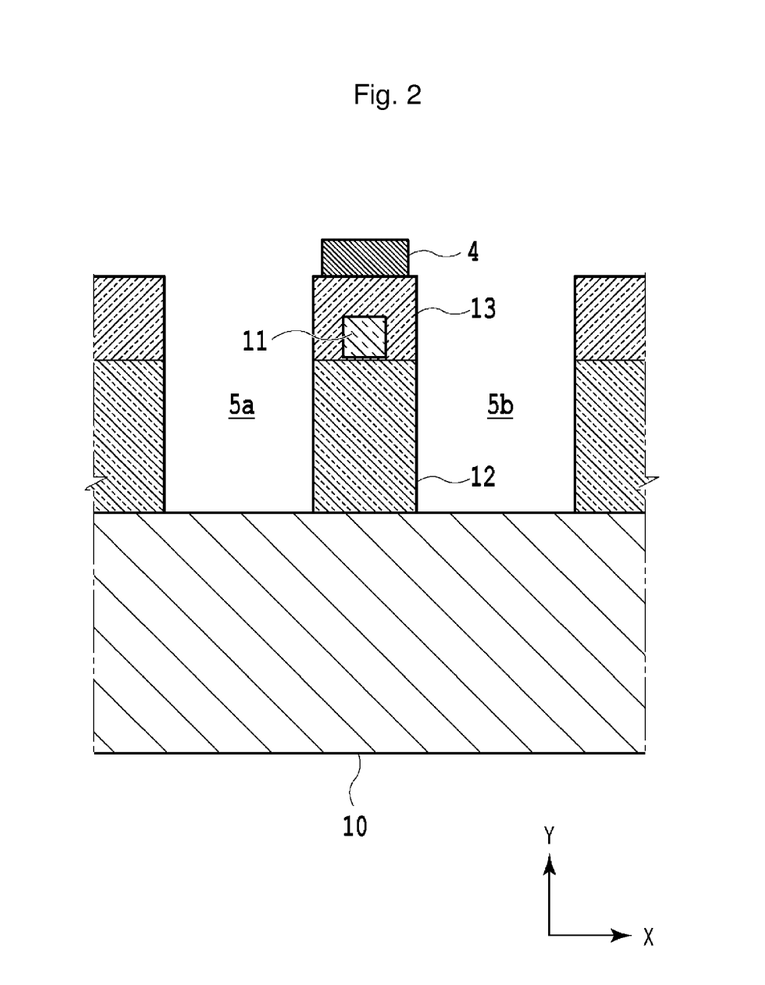
FIG. 2 shows a cross-section of a substrate in a region including a phase modulation element (phase shifter) shown in FIG. 1.

FIG. 2 shows an A-A' cross-section of the substrate in the region including the phase modulation element (phase shifter) shown in FIG. 1. In FIG. 2, the optical waveguide 3b formed on a Si substrate 10 has a configuration in which a core 11 region that confines light is vertically sandwiched between regions called cladding (under clad 12 and over clad 13), and the phase shifter heater 4 is provided on the over clad 13 in the region corresponding to the phase modulation element.

In a silica PLC, silica is normally used in both the core and the cladding. The phase of the guided light can be modulated by controlling the temperature of the core 11 with heat supplied by the heater 4. In order for heat from the heater 4 to be efficiently transmitted to the core 11, the clad on the two sides of the core is etched to form heat insulating grooves 5a and 5b, thus making it possible to efficiently deliver heat to the core.

Normally, Si (silicon) is often used for the substrate 10 of a silica PLC. Because Si has a higher thermal conductivity than silica, the heat supplied by the heater 4 ultimately escapes to the Si substrate 10. In a steady state during heating, due to the temperature gradient between the heater 4 and the Si substrate 10, the amount of heat that escapes to the Si substrate 10 and the amount of heat supplied from the heater 4 are equivalent. For this reason, the thicker the clad between the core 11 and the substrate 10 (i.e., the under clad 12) is, the farther the core is from the Si substrate to which heat escapes, thus making it possible to achieve a higher temperature with the same amount of heat supplied from the heater. Accordingly, increasing the thickness of the under clad makes it possible to reduce the power consumption of a silica PLC switch.

CITATION LIST

Non Patent Literature

[NPL 1] T. Shibata et al., "Silica-Based Waveguide-Type 16×16 Optical Switch Module Incorporating Driving Circuits", in IEEE Photonics Technology Letters, vol. 15, no. 9, pp. 1300-1302, September 2003.

[NPL 2] K. Yamabe, R. Hasunuma, "Atomic Level Thickness Uniformity and Reliability of Ultrathin Silicon Dioxide Films Thermally Grown on Crystalline Silicon", in Journal of the Vacuum Society of Japan, 2015, VOL. 58, NO. 1, pp. 27-34.

[NPL 3] K. Furukawa, "Silicon Wafer Direct-Bonding Technique", in Journal of the Japan Welding Society, 1990, VOL. 59, NO. 2, pp. 105-109.

[NPL 4] Takashi Goh et al., "High-Extinction Ratio and Low-LossSilica-Based 8×8 Strictly Nonblocking Thermooptic Matrix Switch", J. Lightwave Technology. VOL. 17, NO. 7, pp. 1192-1199, JULY 1999.

[NPL 5] T. Watanabe et al., "Silica-based PLC Transponder Aggregateors for Colorless, Directionless, and Contentionless ROADM", OFC/NFOEC 2012, OTh3D.1, Mar. 8, 2012, Los Angeles.

[NPL 6] Kei Watanabe et al., "Ultralow Power Consumption Silica-Based PLC-VOA/Switches", J. Lightwave Technol. VOL. 26, NO. 14, JULY 2008, pp. 2235-2244.

SUMMARY OF THE INVENTION

Technical Problem

Methods for forming silica on an Si substrate include CVD (Chemical Vapor Deposition) and thermal oxidation, and thermal oxidation is known to be able to form a high-quality and highly flat silica film (see NPL 2).

However, in order to form a thick silica film through thermal oxidation, it is necessary for oxygen molecules in the surrounding atmosphere to pass through the already-formed silica film and reach the Si substrate, and the thicker the film is, the longer it takes for the thermal oxidation silica film to grow. For this reason, if a thick thermal oxidation silica film is to be used as an under clad in a silica PLC in order to reduce the power consumption of an optical signal processing device such as an optical switch, the time and cost required for manufacturing rise, which is a problem.

The present invention was achieved in view of the foregoing problem. An object of the present invention is to realize an optical signal processing device that enables using a thermal oxidation silica film as the under clad of a silica PLC while also increasing the thickness of the under clad and reducing the time required for film growth during manufacturing, and to also realize a method for manufacturing the optical signal processing device.

Means for Solving the Problem

In order to achieve the above object, the following is a configuration of one aspect of the present invention.

An optical signal processing device is formed as a planar optical circuit that includes an optical waveguide formed on a silicon substrate, and has a phase modulation element that employs a thermo-optical effect, and, in the optical signal processing device, a substrate having a thermal oxidation silica film and a substrate having a silica film are laminated on each other, and a thermal oxidation silica film is used as an under clad below an optical waveguide core.

The following is are specific configurations of aspects of the present invention.

Configuration 1

An optical signal processing device formed as a planar optical circuit that includes an optical waveguide formed on a silicon substrate, and having a phase modulation element that employs a thermo-optical effect, wherein a plurality of silica films are provided between a core of the optical waveguide and the silicon substrate, and at least one of the silica films was formed by thermal oxidation.

Configuration 2

The optical signal processing device according to configuration 1, wherein a silicon layer is provided at at least one interface between the silica films.

Configuration 3

The optical signal processing device according to configuration 1 or 2, wherein the silicon substrate and the silica films were produced by lamination of a plurality of substrates.

Configuration 4

The optical signal processing device according to any one of configurations 1 to 3, wherein the optical waveguide forms a Mach-Zehnder interferometer.

Configuration 5

The optical signal processing device according to any one of configurations 1 to 4, wherein the optical signal processing device has a function of a matrix switch, a multicast switch, or an optical filter or an optical signal attenuator.

Configuration 6

A method for manufacturing an optical signal processing device, including the steps of: forming a first silica film on a front surface of a first silicon substrate; laminating the first silicon substrate on another second silicon substrate with a first silica film surface on a lamination side; grinding/polishing a back surface of the laminated first silicon substrate; and forming an under clad using thermal oxidation silica obtained by thermal oxidation of a silicon layer at the back surface of the first silicon substrate that was ground/polished.

Configuration 7

A method for manufacturing an optical signal processing device, including the steps of: forming a silica film on a front surface of a first silicon substrate; forming a thermal oxidation silica film on a front surface of a second silicon substrate; laminating the silica film of the first silicon substrate and the thermal oxidation silica film of the second silicon substrate on each other; and grinding/polishing a back surface of the second silicon substrate until the thermal oxidation silica film is exposed, and forming an under clad using thermal oxidation silica.

Configuration 8

The method for manufacturing an optical signal processing device according to configuration 6 or 7, further including the steps of: forming an optical waveguide core and an over clad on the under clad; and forming heat insulating grooves on respective sides of an optical waveguide of a phase modulation element, and attaching a phase shifter heater of the phase modulation element and an electrical wire.

Effects of the Invention

According to the present invention, it is possible to realize an optical signal processing device, such as an optical switch or an optical filter realized using a phase modulation element that employs a heater and an optical waveguide, in which the power consumption amount is reduced by increasing the thickness of the under clad in the PLC of the optical signal processing device, and it is also possible to realize a method for manufacturing the optical signal processing device that shortens the time required for growing a thermal oxidation silica film immediately below an optical waveguide core.

DESCRIPTION OF EMBODIMENTS

The following is a detailed description of embodiments of the present invention with reference to the drawings.

First Embodiment

Figure 3:
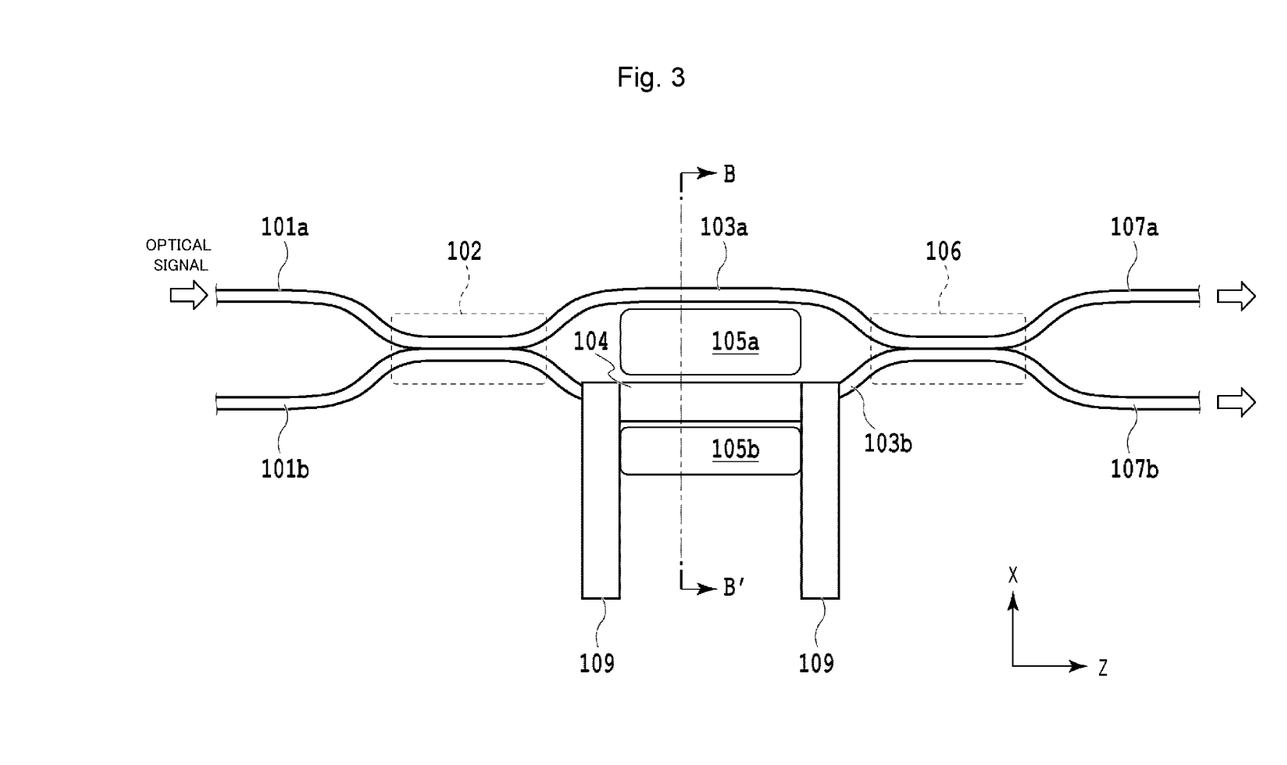
FIG. 3 is a plan view of a substrate of an optical signal processing device according to a first embodiment of the present invention.

FIG. 3 is a diagram (substrate plan view) showing the configuration of an X-Z surface of an optical signal processing device according to a first embodiment of the present invention. The optical signal processing device in FIG. 3 is an optical circuit of a PLC optical switch, and constitutes a Mach-Zehnder interferometer (MZI). In FIG. 3, an optical signal is input from either one of two input waveguides 101a and 101b (here, 101a) on the left side to a two-input two-output directional coupler 102 on the left side and demultiplexed to an arm optical waveguides 103a and an arm optical waveguide 103b, and is then multiplexed in a two-input two-output directional coupler 106 on the right side and output from output waveguides 107a and 107b in accordance with the interference result.

A phase shifter heater 104, which is a phase modulation element, is provided on the arm optical waveguide 103b, which is one of the two branched arm optical waveguides 103a and 103b, and heat insulating grooves 105a and 105b are provided on opposite sides of the arm optical waveguide 103b. When the phase shifter heater 104 supplies heat to the arm optical waveguide 103b, the guided light in the arm waveguide undergoes a phase change due to a thermo-optical effect, thus achieving the function of a phase modulation element (phase shifter). FIG. 3 also shows electrical wires 109 that supply power for driving the phase shifter heater 104. Although not shown in FIG. 3, the configuration may include a control unit that controls a power supply that supplies power to the electrical wires 109 and the amount of supplied power.

Figure 4:
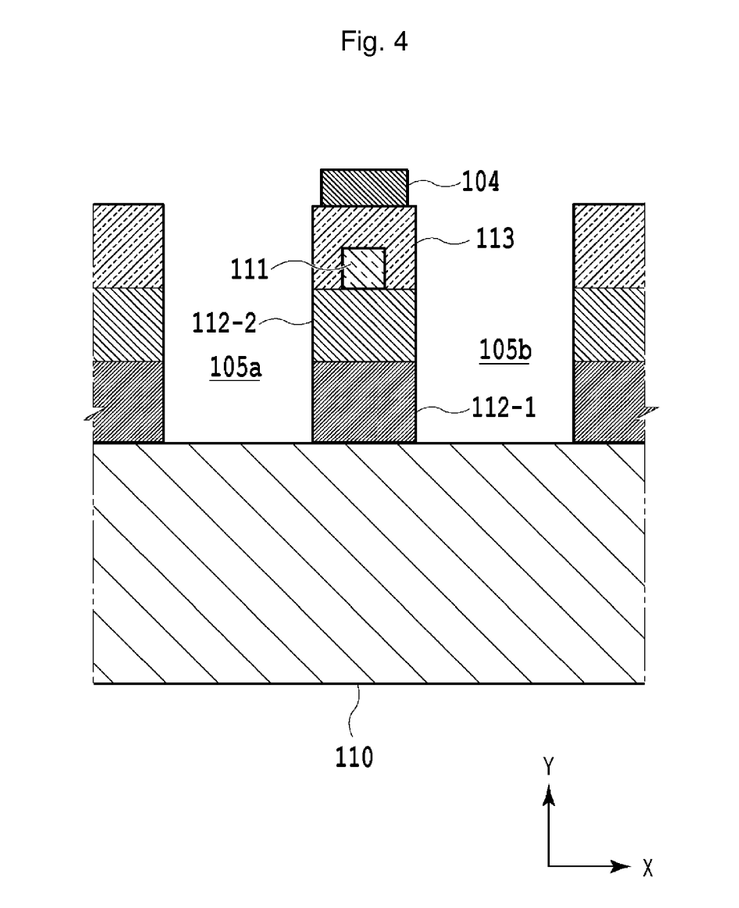
FIG. 4 is a cross-sectional view of the substrate in a region including a phase modulation element (phase shifter) of the optical signal processing device according to the first embodiment of the present invention.

Also, FIG. 4 is a cross-sectional view of the substrate taken along a dashed-dotted line B-B' in the first embodiment shown in FIG. 3.

In this configuration of the first embodiment, a first silica film (112-1) is provided on a silicon substrate 110. A second silica film (112-2) grown by thermal oxidation is further provided on the first silica film (112-1). This silica film layer can be realized by substrate lamination. Details of a method for manufacturing the silica film layer through such substrate lamination are described in a second embodiment.

Also, an optical waveguide core 111 is provided on the second silica film (112-2), and the second silica film (112-2) functions as an under clad. An over clad 113 is formed above and around the optical waveguide core 111. A silica film is often used for the over clad as well, but because it is sufficient that the refraction index is lower than that of the core, the surrounding region may be etched such that air is utilized as the over clad. The phase shifter heater 104 is disposed on the over clad 113. Heat insulating grooves 105a and 105b may be formed by etching the cladding on opposite sides of the core 111.

Figure 5A:
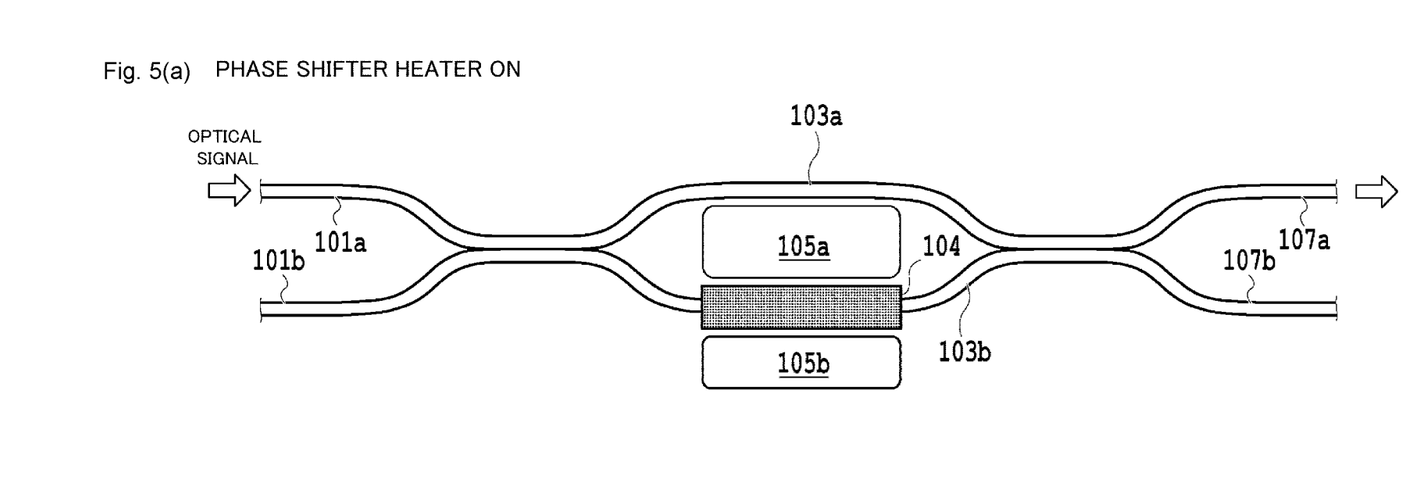
FIGS. 5(a)-5(b) are diagrams showing basic operations of the MZI according to the first embodiment of the present invention.
Figure 5B:
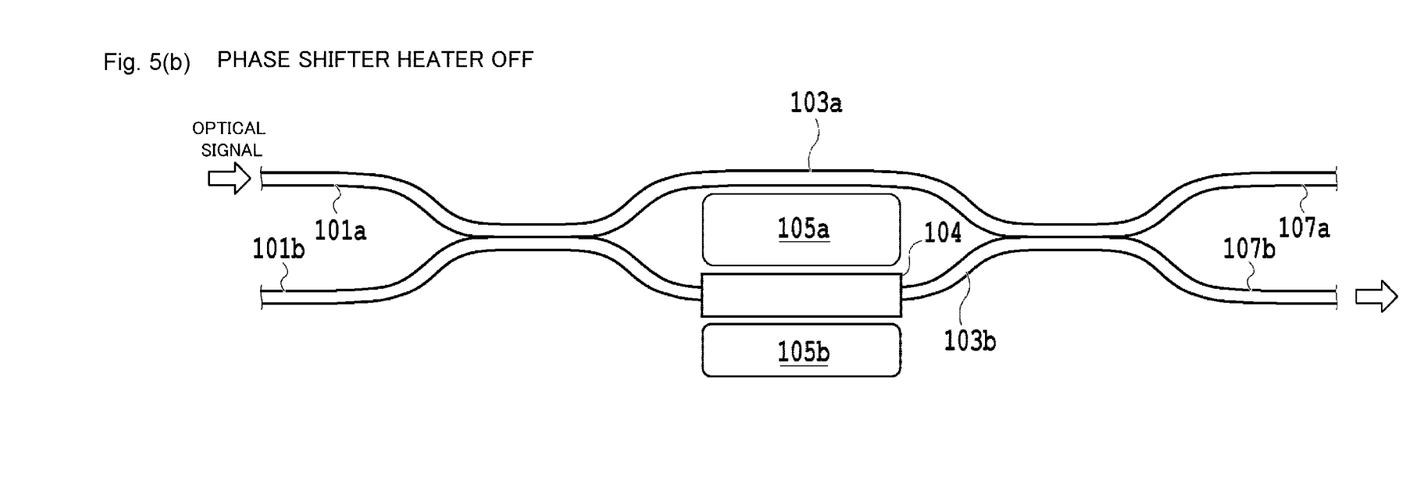

FIG. 5 shows basic operations of the MZI according to the first embodiment of the present invention. In the phase shifter ON state shown in FIG. 5(a), the phase shifter heater is receiving power and generating heat, whereas in the phase shifter OFF state shown in FIG. 5(b), the phase shifter heater is not receiving power and is in a cool state.

In FIG. 5, light input to the MZI is branched by a directional coupler on the input side into two arm optical waveguides 103a and 103b, and is then multiplexed by a directional coupler on the output side after passing through the arms. At this time, the output from the directional coupler on the output side changes depending on a phase difference between the light beams that are input from the two arms to the directional coupler on the output side.

In the optical signal processing device having this configuration, the refraction index of one of the arms of the MZI can be changed by driving the phase shifter, thus making it possible to adjust the phase difference between the light beams that are input to the directional coupler on the output side.

Because the thermo-optical effect is utilized in the phase shifter, heat is supplied to the MZI by the heater 104 or the like. In the case where waveguides are formed on a silicon substrate and silica films are used for the core and cladding, the thermal conductivity of the silicon substrate is much higher than that of the core and the cladding, and furthermore the silicon substrate has a higher volume, and therefore heat escapes to the silicon substrate.

Because the heat insulating grooves 105a and 105b are provided in this configuration, the direction of the radiation of heat supplied by the phase shifter heater 104 is limited to the Y direction, which is a direction toward the substrate 110. In this case, the core 111 is the target whose temperature is to be raised by the supply of heat, and therefore the longer the distance is from the core to the silicon substrate that has a high thermal conductivity, that is to say, the thicker the under clad layers (112-1 and 112-2) are, the higher the temperature of the core can be raised in the steady state even when using the same amount of supplied heat, thus making it possible to perform switching with a lower power consumption.

Although previously mentioned, a thermal oxidation silica film having a high layer quality is preferably used as the under clad, but increasing the thickness thereof is an issue. This is because the thicker a thermal oxidation silica film is, the longer it takes for growth per unit of thickness (the slower the growth speed is). This reduction in growth speed becomes more significant the thicker the film is, and a very long growth time is required to form a thick film.

In contrast, in this configuration of the first embodiment, a silicon substrate having a first silica film formed on the front surface is laminated on another substrate such that the first silica film faces the other substrate, the back surface of the silicon substrate is polished, and then the second silica film is formed thereon by thermal oxidation. Accordingly, it is possible to use a thermal oxidation silica film as the under clad directly below the core, and the total value of the thickness of the silica film between the core and the substrate is the total value of the film thicknesses of the first silica film and the second silica film.

Such lamination after silica film formation is performed when manufacturing an SOI (Silicon on Insulator) substrate or the like, and any of ordinary techniques can be utilized (see NPL 3).

Here, the under clad that has a strong influence on the light-transmitting core is the second silica film that is located immediately below the core, and therefore the first silica film is not required to be a thermal oxidation silica film.

If a thermal oxidation silica film is used for both the first silica film and the second silica film, the thicknesses thereof are approximately half the thickness of a conventional individual thermal oxidation silica film, and therefore the time required for growth can be significantly shortened compared to conventional technology.

Figure 6:
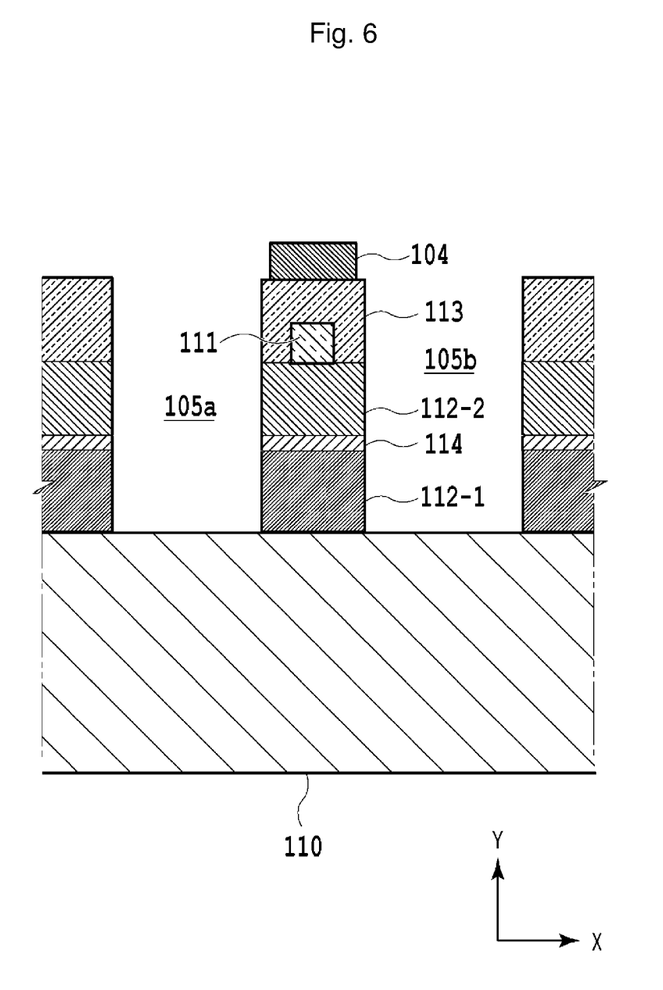
FIG. 6 is a cross-sectional view of a substrate in another configuration of the first embodiment of the present invention.

Also, even in the case of another configuration of the first embodiment in FIG. 6 in which the extent of polishing or thermal oxidation is reduced such that a silicon layer 114 remains between the first silica film (112-1) and the second silica film (112-2), the effects of the present invention are exhibited.

In the case of this other configuration shown in FIG. 6, heat is discharged not only in the Y direction toward the silicon substrate under the under clad, but is also transmitted in the Z direction, which is the forward direction of guided light, and in the X direction, which is orthogonal to the arm extending direction, through the silicon layer 114 that remains between the first silica film and the second silica film. Etching has been performed in the X direction, and air having a very poor thermal conductivity extends in the X direction, and therefore the discharge of heat can be ignored. In this case, the ease with which heat is discharged (propagation multiplier) is dependent on the cross-sectional area for the same escape route composition. Heat escapes easily through a path having a large cross-sectional area, and heat escapes poorly through a path having a small cross-sectional area.

In the case of the other configuration shown in FIG. 6, the cross-sectional area of the heat discharge path in the Z direction is the product of the ridge width of the wave guide portion surrounded by grooves and the thickness of the silicon layer 114 that remains between the first silica film and the second silica film, and the cross-sectional area of the heat discharge path in the Y direction is the product of the ridge width of the wave guide portion surrounded by grooves and the length of the phase shifter.

Normally, the length of the phase shifter is on the order of millimeters, and if the thickness of the silicon layer 114 that remains between the first silica film and the second silica film is sufficiently smaller than that, the effect of discharge through that path is limited and not likely to be a dominant factor. Because the thickness of the silicon layer 114 need only be a certain thickness or smaller, this has an advantage such as that the conditions for thermal oxidation silica film growth can be determined easily.

Also, by laminating two or more silicon substrates, two or more silica films may be included between the optical waveguide core 111 and the silicon substrate 110, and it is sufficient that at least one of the silica films is a thermal oxidation silica film grown by thermal oxidation.

Furthermore, a silicon layer may be included at at least one lamination interface between the silica films.

By forming the under clad that has this configuration, it is possible to realize switching the output of the MZI, which is a PLC optical switch, with a lower power consumption, while also cutting down the total manufacturing time.

Second Embodiment

Method for Manufacturing Optical Signal Processing Device

In the description of the first embodiment, in order to use a thermal oxidation silica film in the under clad and increase the thickness of the silica film up to the silicon substrate, it is described that a laminated substrate structure is employed, thus making it possible to reduce the power consumption of the optical signal processing device and shorten the manufacturing time.

The following describes a method for manufacturing the optical signal processing device as a second embodiment of the present invention. The following particularly describes a substrate lamination method in detail with reference to FIG. 7.

In the method for manufacturing the optical signal processing device according to the second embodiment, overall, a first silica film is formed on the front surface of a first silicon substrate, then the first silicon substrate is flipped and laminated on a second silicon substrate with the first silica film surface on the lamination side, and then the layer thickness of the silicon layer on the silica films is controlled by grinding/polishing the back surface of the laminated first silicon substrate.

Thereafter, a second silica film is formed by further thermal oxidation of the silicon layer remaining on the back surface of the first silicon substrate, thus making it possible to form the thermal oxidation silica film that is to serve as the under clad in a short time.

FIGS. 7(a) to 7(d) show a detailed flow of the manufacturing method of the second embodiment.

Figure 7A:
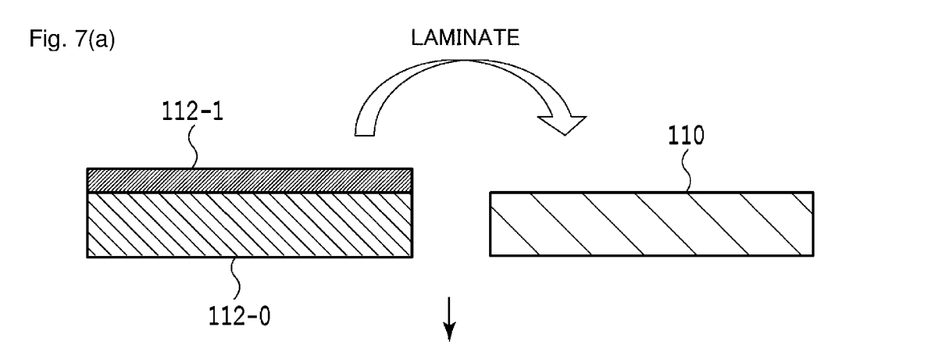
FIGS. 7(a)-7(d) are diagrams illustrating a method for manufacturing the optical signal processing device, according to a second embodiment of the present invention.

First, in FIG. 7(a), two Si substrates 110 and 112-0 are prepared, and a silica film 112-1 is formed on the front surface of the Si substrate 112-0. The silica film 112-1 may be a thermal oxidation silica film, but is not required to be a thermal oxidation silica film. The Si substrate 112-0 is then flipped and laminated on the Si substrate 110 with the silica film 112-1 surface on the lamination side.

Figure 7B:
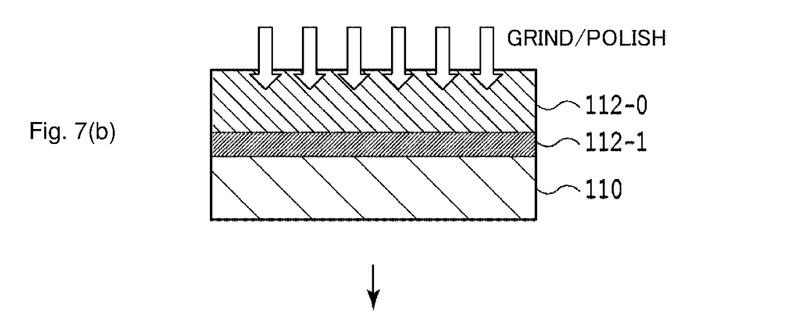

Next, in FIG. 7(b), the upper surface (the back surface or underside in FIG. 7(a)) of the Si substrate 112-0, which was flipped and laminated on the Si substrate 110, is ground/polished to a predetermined thickness.

Figure 7C:
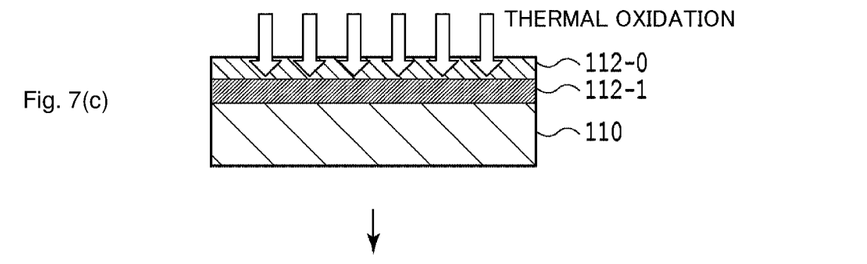

In FIG. 7(c), the ground/polished Si substrate 112-0 is subjected to thermal oxidation processing. The thermal oxidation processing is not required to be performed for the entire thickness of the Si substrate 112-0, and need only be performed so as to form a thermal oxidation silica film 112-2 that has a predetermined thickness. If a portion of the Si substrate 112-0 remains due to not being subjected to thermal oxidation processing, the remaining portion becomes the silicon layer 114 shown in FIG. 6.

Figure 7D:
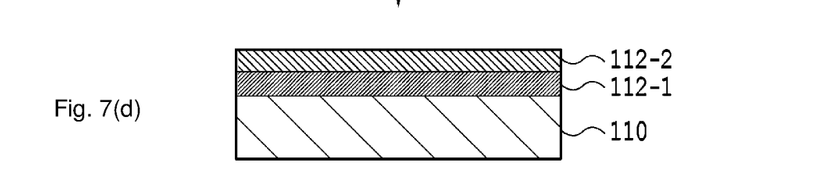

In FIG. 7(d), the thermal oxidation silica film 112-2 formed by thermal oxidation processing is obtained on the silica film 112-1 formed in FIG. 7(a). The silica film 112-1 and the thermal oxidation silica film 112-2, or the silica film 112-1 and the thermal oxidation silica film 112-2 with the silicon layer 114 therebetween, form a silica film that is thick overall, and the thermal oxidation silica film 112-2 constitutes the under clad.

Thereafter, the optical waveguide core 111, the over clad 113, and the heat insulating grooves 105a and 105b are formed, and the phase shifter heater 104 and the electrical wire 109 are attached to obtain the PLC.

At this time, as previously described in the first embodiment, it is not a problem if the laminated silica film 112-1 is not formed through thermal oxidation. Also, even if the silica film 112-1 is formed through thermal oxidation, as long as the thermal oxidation layer is formed before lamination, there is no influence on the PLC manufacturing time.

As another manufacturing method, a configuration is possible in which a silica film is formed on the front surface of a first silicon substrate, a thermal oxidation silica film is formed on the front surface of a second silicon substrate, and the silica film surfaces of the first second silicon substrate are laminated together to produce a thick silica film. Thereafter, the back surface of the second silicon substrate is ground/polished until the thermal oxidation silica film is exposed, thus obtaining the under clad constituted by thermal oxidation silica.

Various methods are conceivable for lamination and film growth as described before, but in the present invention, by laminating substrates having silica films that were formed separately, the total film thickness of the silica film up to the substrate can be higher than the thickness of a silica film formed by thermal oxidation.

Third Embodiment

Because the amount of drive power required for an MZI can be reduced with the present invention, the greater the number of MZIs that need to be driven in an optical signal processing device is, the greater the reduction in power consumption is.

For example, with a M-input N-output optical switch such as a PILOSS switch (NPL 4) or a multicast switch (NPL 5), 2×N MZIs need to be driven. For this reason, if a large-scale switch is implemented, an increase in the required drive power is a problem (see NPL 4 and NPL 5).

According to the present invention, it is possible to reduce the amount of power for driving each MZI, thus achieving a significant effect of reducing the overall device power consumption.

A variable optical attenuator (VOA) is another example of a device in which many MZIs need to be driven (see NPL 6). In a VOA that includes MZIs, the output powers of optical signals are controlled by adjusting the phase shifters of the MZIs. Using an array of MZIs makes it possible for the intensities of many optical signals to be independently controlled by one device. However, all of the MZIs need to be driven, thus leading to the problem that the power consumption increases proportionally to the array size. In this case as well, the present invention is an effective solution due to being able to reduce the power consumption of the MZIs.

Furthermore, there are cases where multiple MZIs are driven in an optical filter.

Figure 8:
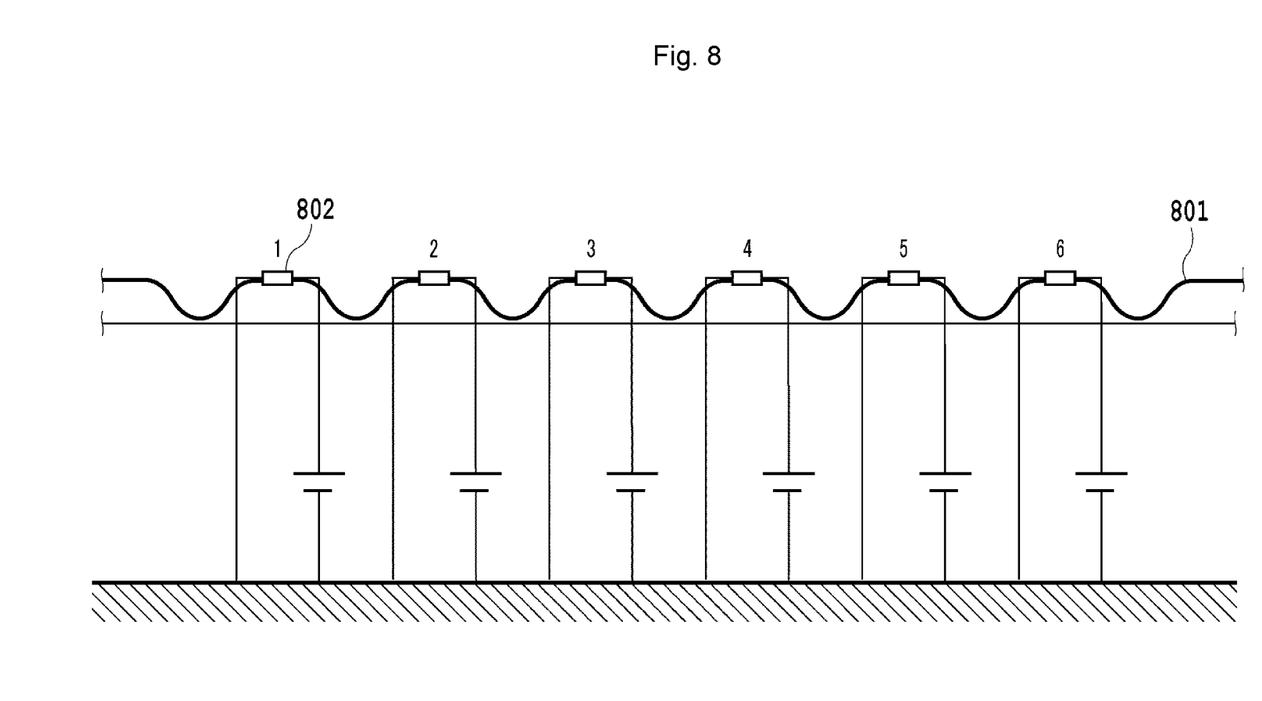
FIG. 8 is a diagram illustrating a lattice filter according to a third embodiment of the present invention

FIG. 8 is a diagram illustrating an example of a lattice filter according to a third embodiment of the present invention. FIG. 8 shows an optical waveguide 801, which is an actual optical circuit on an optical waveguide substrate, and also the layout of electrical wires for controlling phase shifters 802-1 to 802-6.

Although a lattice filter is described as an example in the third embodiment, the configuration can clearly be applied to a transversal filter, a filter using a ring resonator, a variable optical attenuator array using an MZI, or an optical signal processing device that includes a combination of the aforementioned members.

INDUSTRIAL APPLICABILITY

As described above, according to the present invention, it is possible to realize an optical signal processing device, such as an optical switch or an optical filter realized using a phase modulation element that employs a heater and an optical waveguide, in which the power consumption amount is reduced by increasing the thickness of the under clad in the PLC of the optical signal processing device, and it is also possible to realize a method for manufacturing the optical signal processing device that shortens the time required for growing a thermal oxidation silica film immediately below an optical waveguide core.

REFERENCE SIGNS LIST 1a, 1b, 101a, 101b Input waveguide
2, 6, 102, 106 Directional coupler
3a, 3b, 103a, 103b Arm optical waveguide
7a, 7b, 107a, 107b Output waveguide
4, 104 Phase shifter heater
5a, 5b, 105a, 105b Heat insulating groove
10, 110, 112-0 Si Substrate
11, 111 Core
12 Under clad
112-1 Silica film
112-2 Thermal oxidation silica film
13, 113 Over clad
114 Silicon layer
109 Electrical wire

The invention claimed is:

1. An optical signal processing device formed as a planar optical circuit comprising:
   an optical waveguide formed on a silicon substrate, the optical waveguide comprising:
      a phase modulation element that employs a thermo-optical effect;
   a first silica thin film that is provided between a core of the optical waveguide and the silicon substrate;
      a second silica thin film that is provided between the core of the optical waveguide and the silicon substrate;
      a silicon layer that extends an entire width of an interface between the first silica thin film and the second silica thin film;
      a first insulating groove; and
      a second insulating groove,
   wherein at least one of the first and second silica thin films was formed by thermal oxidation,
   wherein the core of the optical waveguide is stacked on top the first silica thin film, the first silica thin film is stacked on top the silicon layer, the silicon layer is stacked on top of the second silica thin film, and the second silica thin film is stacked on top of the silicon substrate,
   wherein a first width of the first silica thin film, the silicon layer, and the second silica thin layer are the same,
   wherein a second width of the first and second insulating grooves is the same, and
   wherein the second width of the first and second insulating grooves is larger than the first width of the first silica thin film, the silicon layer, and the second silica thin layer.

2. The optical signal processing device according to claim 1, wherein the silicon substrate and the first and second silica thin films were produced by lamination of a plurality of substrates.

3. The optical signal processing device according to claim 1, wherein the optical waveguide forms a Mach-Zehnder interferometer.

4. The optical signal processing device according to claim 1, wherein the optical signal processing device has a function of a matrix switch, a multicast switch, or an optical filter or an optical signal attenuator.

5. The optical signal processing device according to claim 3, wherein the silicon substrate and the silica films were produced by lamination of a plurality of substrates.

6. The optical signal processing device according to claim 2, wherein the optical waveguide forms a Mach-Zehnder interferometer.

7. The optical signal processing device according to claim 2, wherein the optical signal processing device has a function of a matrix switch, a multicast switch, or an optical filter or an optical signal attenuator.

8. The optical signal processing device according to claim 3, wherein the optical signal processing device has a function of a matrix switch, a multicast switch, or an optical filter or an optical signal attenuator.

* * * * *